US009053472B2

(12) United States Patent
Ferris et al.

(10) Patent No.: US 9,053,472 B2
(45) Date of Patent: *Jun. 9, 2015

(54) OFFERING ADDITIONAL LICENSE TERMS DURING CONVERSION OF STANDARD SOFTWARE LICENSES FOR USE IN CLOUD COMPUTING ENVIRONMENTS (75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/714,065

(22) Filed: Feb. 26, 2010

(65) Prior Publication Data
US 2011/0213713 A1 Sep. 1, 2011

(51) Int. Cl.
| G06F 21/00 | (2013.01) |
| G06Q 20/12 | (2012.01) |
| G06Q 10/10 | (2012.01) |
| G06Q 30/06 | (2012.01) |
| G06Q 50/18 | (2012.01) |
| G06Q 40/00 | (2012.01) |
| G06F 21/10 | (2013.01) |
| G06F 21/12 | (2013.01) |

(52) U.S. Cl.
CPC ............ *G06Q 20/1235* (2013.01); *G06Q 10/10* (2013.01); *G06Q 30/0601* (2013.01); *G06Q 30/0641* (2013.01); *G06Q 50/184* (2013.01); *G06Q 50/188* (2013.01); *G06Q 40/12* (2013.01); *G06F 21/105* (2013.01); *G06F 21/12* (2013.01); *G06F 2221/0759* (2013.01); *G06F 2221/0768* (2013.01)

(58) Field of Classification Search
USPC .......................................................... 705/59
See application file for complete search history.

(56) References Cited

U.S. PATENT DOCUMENTS

| 5,629,980 | A | * | 5/1997 | Stefik et al. ..................... 705/54 |
| 5,765,152 | A | * | 6/1998 | Erickson ............................. 1/1 |
| 5,892,900 | A | * | 4/1999 | Ginter et al. .................... 726/26 |
| 6,463,457 | B1 | | 10/2002 | Armentrout et al. |
| 7,313,796 | B2 | | 12/2007 | Hamilton et al. |
| 7,439,937 | B2 | | 10/2008 | Ben-Shachar et al. |
| 7,529,785 | B1 | | 5/2009 | Spertus et al. |
| 7,546,462 | B2 | | 6/2009 | Upton |
| 7,596,620 | B1 | | 9/2009 | Colton et al. |
| 7,925,554 | B1 | * | 4/2011 | Sirota et al. .................... 705/34 |
| 2001/0039497 | A1 | | 11/2001 | Hubbard |
| 2002/0069276 | A1 | | 6/2002 | Hino et al. |
| 2002/0165819 | A1 | | 11/2002 | McKnight et al. |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Zeshan Qayyum
(74) *Attorney, Agent, or Firm* — Lowenstein Sandler LLP (57) ABSTRACT

A "Bring Your Own License" (BYOL) service can convert users' "off-the-shelf" (OTS) software licenses for use in public clouds according to rules provided by independent software vendors (ISVs). The BYOL service can offer additional license terms to the users during conversion of the OTS software license on behalf of the ISVs. The additional license terms can be an expansion of the use of the software, an expansion of the technical support offer by the new cloud license, and expansion of the duration of use.

20 Claims, 7 Drawing Sheets

(56) References Cited

U.S. PATENT DOCUMENTS

| | | |
|---|---|---|
| 2003/0037258 A1 | 2/2003 | Koren |
| 2003/0048907 A1* | 3/2003 | Nakahara et al. ............. 380/277 |
| 2003/0103528 A1* | 6/2003 | Kawaguchi et al. .......... 370/468 |
| 2003/0110252 A1 | 6/2003 | Yang-Huffman |
| 2003/0135609 A1 | 7/2003 | Carlson et al. |
| 2003/0172035 A1* | 9/2003 | Cronce et al. .................. 705/59 |
| 2004/0093271 A1* | 5/2004 | Walker et al. .................. 705/14 |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0190409 A1* | 8/2006 | Hillegass et al. ............... 705/59 |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0073626 A1* | 3/2007 | Reeder et al. ................... 705/59 |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0174993 A1* | 7/2010 | Pennington et al. .......... 715/738 |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |
| 2011/0313815 A1* | 12/2011 | Brandstetter et al. ........ 705/7.33 |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detectig Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Muitiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

(56) References Cited

OTHER PUBLICATIONS

Morgan, "Systems and Methods for Self-Moving Operating System installation in Cloud-Based Network", U.S. Appl. No. 13/149,877, filed May 31, 2011.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems far Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, flied Feb. 24, 2009.
DeHaan et al., "Methods and Systems for Flexible Cloud Management", U.S. Appl. No. 12/473,041, fled May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/626,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketpiace Brokerage Exchange of Excess Subscribed Resources Using Dynamic Subscription Periods", U.S. Appl. No. 13/037,351, filed Feb. 28, 2011.

* cited by examiner

| xyz SOFTWARE COMPANY | |
|---|---|
| General Additional Terms | Charge |
| Increase # of concurrent users | $0.10 per user |
| Increase # of virtual machines | $10.00 per machine |
| Increase Duration | $100.00 per month |
| Add Technical Support | $1000.00 per virtual machine |
| SPECIFIC Additional Terms | |
| Allow conversion of Word Processor v.1 | $500.00 per license |
|  |  |

OFFERING ADDITIONAL LICENSE TERMS DURING CONVERSION OF STANDARD SOFTWARE LICENSES FOR USE IN CLOUD COMPUTING ENVIRONMENTS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, to utilize the cloud, the user must rely on the software provided by the cloud. This, however, can raise the cost for the user to utilize the cloud. Because the user is relying on cloud to provide the software, the cost of the software will be added to the fee paid by the user to access the cloud. Additionally, this may waste resources already held by the user. For example, the user may already own software licenses for the same software being provided by the cloud.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for enabling users to utilize standard software licenses in public cloud computing environments. More particularly, embodiments relate to platforms and techniques in which a "Bring Your Own License" (BYOL) service can convert users' "off-the-shelf" (OTS) software licenses for use in public clouds according to rules provided by independent software vendors (ISVs).

According to embodiments, a BYOL service can be configured to provide software license conversion and license monitoring services to software users and ISVs. In particular, the BYOL service can be configured to register the ISVs with the BYOL service. The BYOL service can be configured to receive, from the ISVs, rules by which to convert terms of OTS software licenses, provided by the ISVs, to terms relevant to public clouds. The rules provided by art ISV can convert the terms associated with the ISV's OTS software licenses (e.g. number of instances, number of users, duration, technical support provided) to terms associated with public clouds (e.g. number of concurrent users, number of virtual machines, number of different clouds, technical support). Once received, the BYOL service can be configured to store the rules for each ISV in ISV records.

According to embodiments, the BYOL service can be configured to register users that wish to use OTS software programs with OTS software licenses in public clouds. Once registered, the BYOL service can receive requests for the users to convert OTS software licenses, held by the user, to licenses for use in a public cloud. In particular, a particular user can identify an OTS software license, held by the user, by providing information such as software name, associated ISV, number of OTS software licenses held, and terms of the OTS software license (if necessary). The BYOL service can search the ISV records for the appropriate rules to convert the terms of the OTS software license, held by the user, to a new cloud software license for use in the public cloud. Once converted, the BYOL service can notify the user and the appropriate ISV of the terms of the new cloud software license. Additionally, the BYOL can be configured to store the new cloud software license, including the converted terms, in a record associated with the particular user and the ISV.

According to embodiments, the BYOL service can be configured to offer additional license terms to the users during conversion of the OTS software license on behalf of the ISVs. The BYOL service can be configured to receive, from the ISVs, additional license terms that can expand or modify the new cloud software license. Additionally, the BYOL service can be configured to receive, from the ISVs, a charge associated with the additional license terms. Once an OTS software license is converted for a particular user, the BYOL service can be configured to offer the additional license terms to the user at the charge specified by the ISV. The additional license terms can be any type of terms that were not contemplated by the OTS software license but relevant to the use of the software in a public cloud. For example, the additional license terms can be an expansion of the use of the software (e.g. additional concurrent users, additional virtual machines, additional number of cloud deployments beyond the converted license terms), an expansion of the technical support offer by the new cloud license (e.g. technical support for the cloud deployment), expansion of the duration, and the like.

According to embodiments, if the user accepts the additional license terms, the BYOL service can be configured to notify the appropriate ISV of the acceptance of the additional license terms. Likewise, the BYOL service can be configured to negotiate payment of the charge for the additional license terms with the user and forward the payment to the appropriate ISV. Additionally, the BYOL service can be configured to establish a communication channel between the user and the appropriate ISV in the event the user and ISV desire to negotiate the additional license terms and/or payment of the charge.

By providing license conversion, the BYOL service allows the user to utilize already purchased software programs in public clouds. Accordingly, the user can reduce the cost required to migrate computing processes to the cloud. Additionally, the BYOL service allows ISVs to extend their OTS software to the cloud computing environments. Also, by offering additional license terms, the BYOL allows the ISVs to extend their revenue stream associated with the OTS software.

Figure 1:
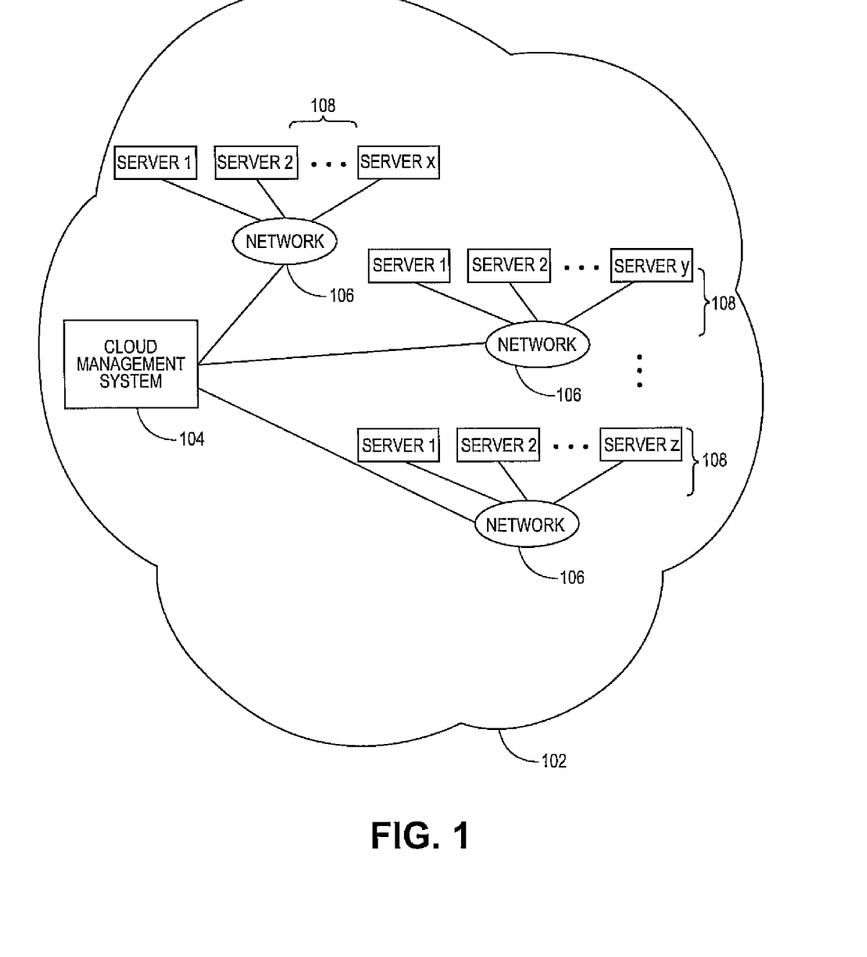
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
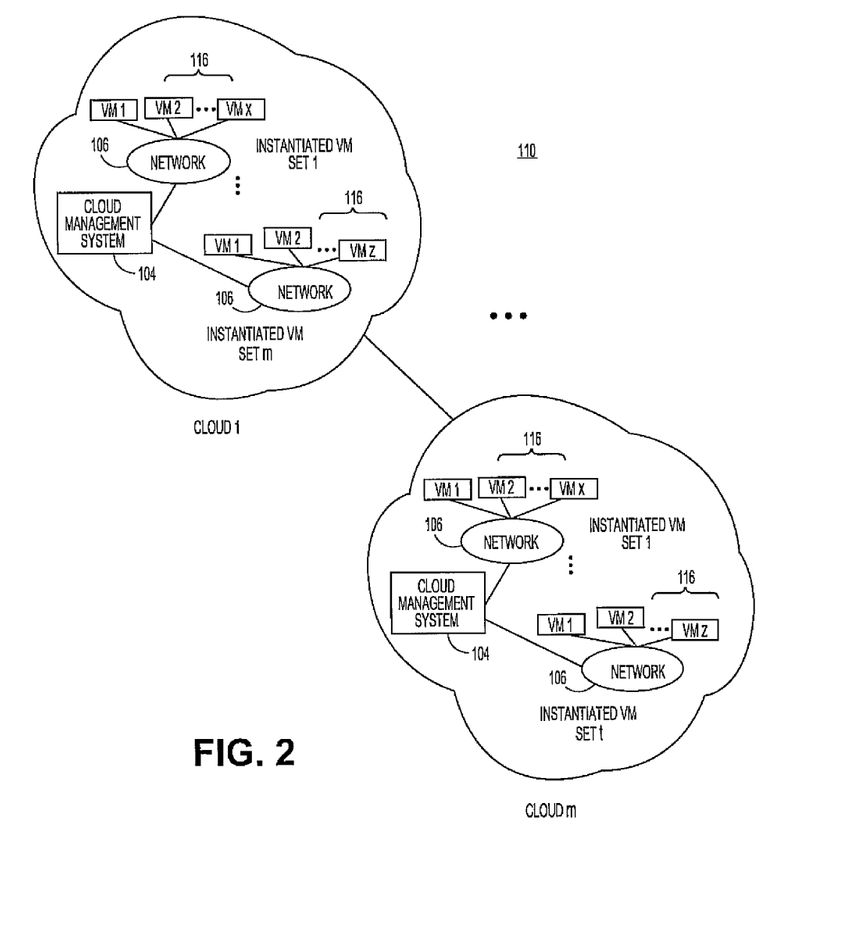
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
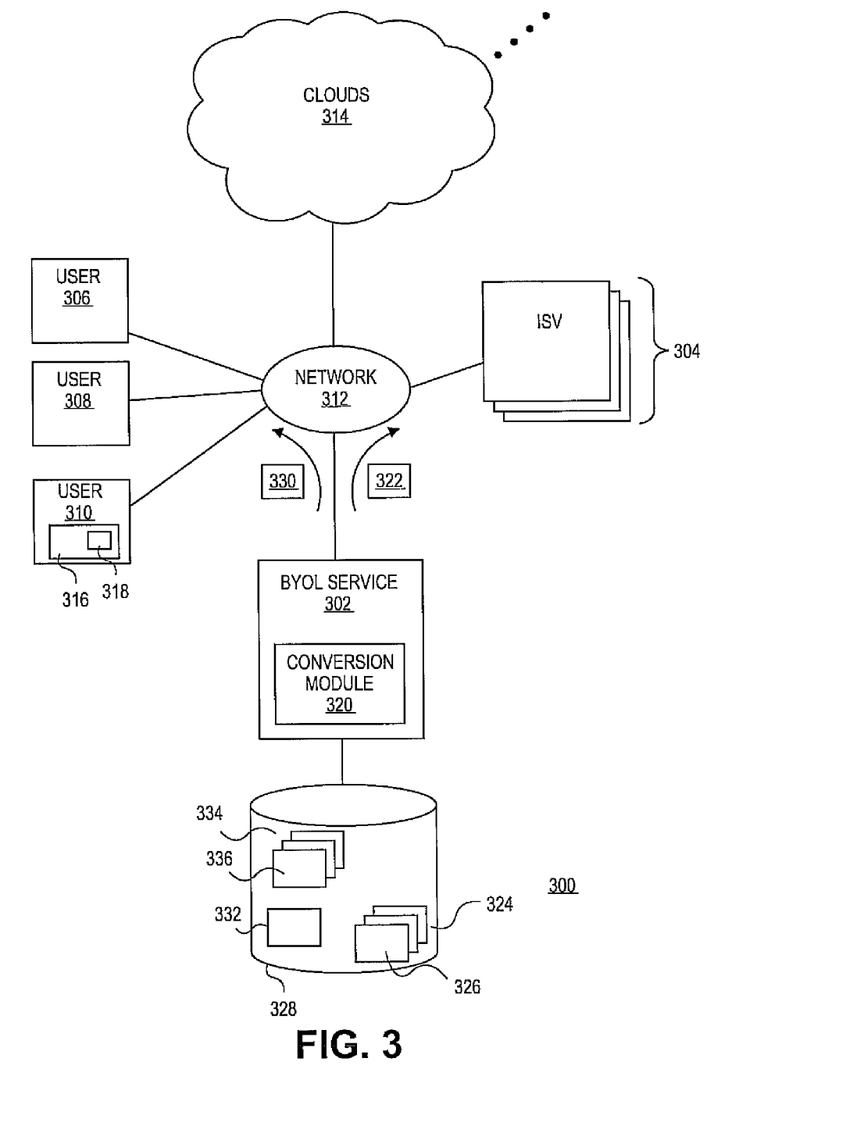
FIG. 3 illustrates an overall system in which a service can provide software license conversion for use in cloud computing environments, according to various embodiments.

FIG. 3 illustrates aspects of a network environment 300 in which a "Bring Your Own License" (BYOL) service 302 can communicate with one or more independent software vendors (ISVs) 304 and one or more users 306, 308, and 310, via one or more networks 312, according to various embodiments. In particular, the BYOL service 302 can be configured to provide software license conversion and management services to the ISVs 304 and the users 306, 308, and 310. While FIG. 3 illustrates various components of the network environment 300, one skilled in the art will realize that components can be added or removed.

In embodiments, the one or more users 306, 308, and 310 can utilize one or more of the clouds 314 to support computing processes of the users 306, 308, and 310. The computing processes can be any type of computing processes, such as virtual machines, software appliances, software programs (e.g. OS, applications and the like), etc. The users 306, 308, and 310 can be any type of entity, such as individual users, corporations, companies, universities, and the like, that utilizes the clouds 314 to support computing processes. While FIG. 3 will be described below, in examples, with specific reference to the user 310, one skilled in the art will realize that the processes and methods can apply to any of the users 306, 308, and 310 or any other users. Additionally, while FIG. 3 illustrates users 306, 308, and 310, one skilled in the art will realize that methods and processes can apply to any number of users.

In embodiments, the clouds 314 can be any type of cloud computing environment, such as the cloud computing environments described above in FIGS. 1 and 2. As described above, the clouds 314 can include any number of computing systems to support the computing processes in the cloud. The computing systems can be any type of computing systems capable of supporting computing processes, such as servers, laptops, desktops, and the like. The computing systems can include a number of hardware resources, which are used to support the computing processes (e.g. virtual machines, software appliances, processes, software programs, and the like) in the clouds 314, such as processors, memory, network hardware and bandwidth, storage devices, etc. Additionally, each of the clouds 314 can include a cloud management system as described above. The cloud management systems can be supported by the computing resources of their respective clouds 314 or supported by independent computing systems.

In embodiments, the clouds 314 can be operated and controlled by any number of entities. For example, one or more of the clouds 314 can be owned and/or operated by a public cloud vendor, such as Amazon™, Inc., in order to provide the services of the cloud to subscribers and customers. Likewise, for example, one or more of the clouds 314 can be owned and/or operated by one or more of the users 306, 308, and 310, and the resources of the cloud can be used by the entity, internally, to support various computing processes. In either case, the clouds 314 can be configured to include hardware, described above, and software resources to support computing processes. For example, if a particular cloud 314 is operated by a public cloud vendor, the software resources can include operating systems, such as a distribution of Linux provided by Red Hat™ Corporation, and various software programs requested or typically desired by subscribers, such as middleware applications, web hosting applications, electronic mail (email) applications, and the like.

In embodiments, the one or more networks 312 can be or include the Internet, or other public or private networks. The one or more or more networks 312 can be or include wired, wireless, optical, and other network connections. One skilled in the art will realize that the one or more networks 312 can be any type of network, utilizing any type of communication protocol, to connect the computing systems.

As mentioned above, the clouds 314 can provide software resources such as software programs to the users 306, 308, and 310. Typically, the clouds 314 will offer access to these software resources for a fee. The users 306, 308, and 310 can desire to utilize software programs, already purchased and owned by the users, in the clouds 314. For example, the user 310 can own an "off-the-shelf" (OTS) software program 316 provided by one of the ISVs 304. In embodiments, the user 310 can desire to utilize the OTS software program 316 in one or more of the clouds 314, such as a public cloud. The OTS software program 316 can be covered by an OTS software license 318. When the user 310 purchased the OTS software program 316, the user 310 agreed to the terms of the OTS software license 318. The terms of the OTS software license 318 can be tailored to cover the use of the OTS software program 316 on computing systems owned and operated by the user 310. The terms of the OTS software license 318 can include number of users allowed to utilize the OTS software program 316, the number of instances of the OTS software program 316 allowed to operate simultaneously, the duration of the OTS software license 318, and technical support provided by the ISV 304. The terms of the OTS software license 318, however, may not be applicable or translate to the use of the OTS software program 316 in the clouds 314. In fact, the terms of the OTS software license 318 may prohibit or restrict the use of the OTS software program 316 in the clouds 314.

In embodiments, the BYOL service 302 can be configured to provide a service to convert OTS software licenses offered by the ISVs 304 and owned by the users 306, 308, and 310, into new cloud software licenses so that the users 306, 308, and 310 can utilize OTS software programs in the clouds 314. To convert the OTS software licenses, the BYOL service 302 can be configured to convert the OTS software licenses according to rules provided by the ISVs 304. The BYOL service 302 can be operated by an entity that provides the conversion services to the users 306, 308, and 310 and the ISVs 304. The conversion services can be provided to the users 306, 308, and 310 and the ISVs 304 at a fee. The BYOL service 302 can be supported by one or more computing systems, such as servers, laptops, desktops, and the like, which include conventional components of a computing system, such as such as processors, memory, network interfaces, computer readable storage media and devices, etc. Likewise, the BYOL service 302 can be provided and supported by one or more of the clouds 314.

In embodiments, the conversion processes of the BYOL service 302 can be performed by a conversion module 320. The conversion module 320 can be implemented as a software program that is configured to perform the conversion services as described herein. Likewise, the conversion module 320 can be implemented as a portion of other software programs. In either case, the conversion module 320 can be configured to include the necessary logic, commands, instructions, and protocols to perform the processes described herein. In any implementation, the conversion module 320 can be written in any type of conventional programming language such as C, C++, JAVA, Perl, and the like. Additionally, the conversion module 320 can be stored in computer readable storage devices or media (CD, DVD, hard drive, portable storage memory, etc.) whether local to computing systems supporting the BYOL service 302 or remotely located.

In embodiments, to provide the conversion services, the BYOL service 302 can be configured to register the ISVs 304 with the BYOL service 302. The BYOL service 302 can be configured to receive, from the ISVs 304, rules by which to convert terms of OTS software licenses, provided by the ISVs 304, to terms relevant to the clouds 314. To register the ISVs 304, the BYOL service 302 can be configured to provide an interface 322 to register the ISVs 304 and to receive the rules from the ISVs 304. The interface 322 can be configured to provide the details and terms of the conversion services (conversion services offered, fee, etc.). Likewise, if an ISV 304 accepts the offer of conversion services, the interface 322 can be configured to receive, from the ISV 304, the rules for converting the OTS software licenses. To achieve this, the conversion module 320 can be configured to include the necessary logic, commands, instructions, and protocols to generate and provide the interface 322, such as command line or graphical user interfaces (GUIs), to receive the request for the conversion services.

The conversion module 320 can be configured to provide the interface 322 to the ISVs 304 via the network 312 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol. Likewise, the conversion module 320 can be configured to allow software programs executing on the computing systems of the ISVs 304 to provide the request. The conversion module 320 can be configured to include an application programming interface (API) to provide the interface 322 that allows software programs of the ISVs 304 to call the conversion module 320 and provide the request.

In embodiments, the rules provided by an ISV 304 can convert the terms associated with the ISV's OTS software licenses to terms associated with the clouds 314. For example, the rules can define general rules for converting general terms associated with any OTS software licenses (e.g. number of instances, number of users, duration, technical support provided) to general terms associated with the clouds 314 (e.g. number of concurrent users, number of virtual machines, number of different clouds, technical support). Likewise, the rules can define specific rules for converting a particular OTS software license provided by a ISV 304 to a new cloud software license.

In embodiments, once the rules are received, the BYOL service 302 can be configured to store the rules in a set 324 of ISV records 326. In particular, the conversion module 320 can be configured to store the rules for each ISV 304 in a ISV record 326 associated with an identification of the ISV 304 (e.g. name). The conversion module 320 can maintain the set 324 of ISV records 326 in a repository 328, such as a database. The repository 328 can be stored in computer readable storage devices or media (CD, DVD, hard drive, portable storage memory, etc.) whether local to the computing systems supporting the BYOL service 302 or remotely located.

Figure 4A:
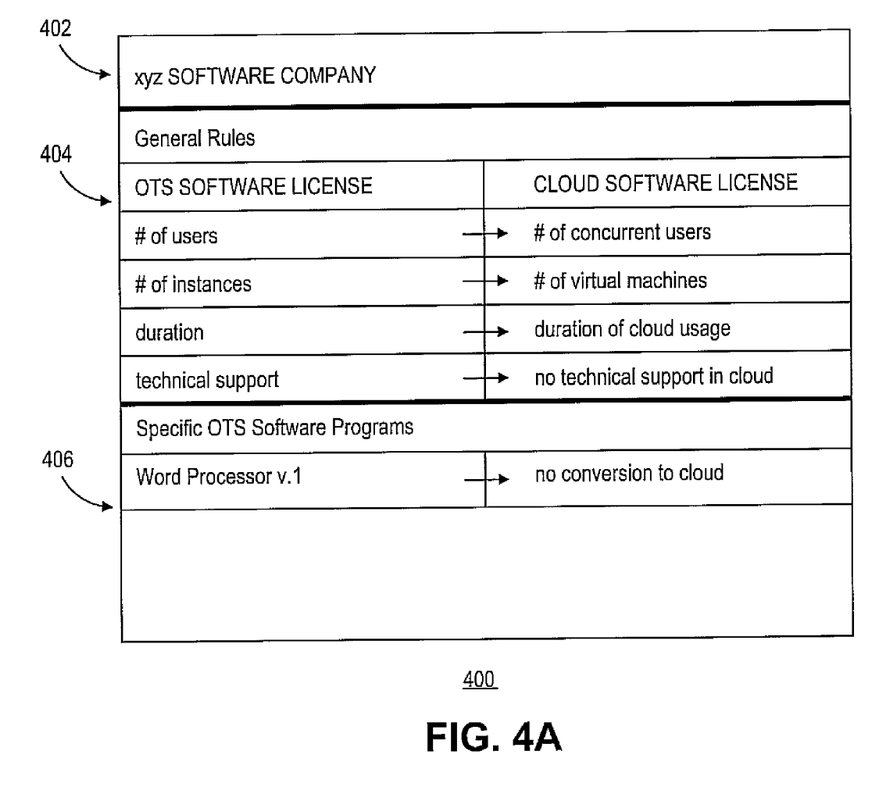
FIG. 4A illustrates an exemplary record for storing rules associated with the software license conversion, according to various embodiments.

FIG. 4A illustrates an exemplary ISV record 400 for a particular ISV 304 "XYS Software Company", according to various embodiments. As illustrated, the record 400 can include an entry 402 that identifies the particular ISV 304 associated with the record 400. The record 400 also include an entry 404 that defines the general rules for converting the OTS software licenses. The entry 404 can include a table that maps the terms of the OTS software license to terms associated with the clouds 314. As illustrated, the general rules, provided by the ISV 304, can alter the terms of the original OTS software license, for example, no technical support provided in the cloud. The record 400 can also include an entry 406 that define the rules for specific OTS software programs. As illustrated, for example, the ISV 304 can provide a rule that does not permit conversion of OTS software licenses for the specific software program "Word Processor version 1". While FIG. 4A illustrates several rules for converting terms, one skilled in the art will realize that FIG. 4A is one example. The ISVs 304 can provide any rules for converting the terms of an OTS software license to terms relevant to the cloud 314.

In embodiments, the BYOL service 302 can be configured to register and to receive requests from the users 306, 308, and 310 that wish to use OTS software programs in the clouds 314 and configured to convert the OTS software licenses to new cloud software licenses. To register the users 306, 308, and 310, the BYOL service 302 can be configured to provide an interface 330 to receive the request from the users 306, 308, and 310. The interface 330 can be configured to provide the details and terms of the conversion services (conversion services offered, fee, etc.). Likewise, if one of the users 306, 308, and 310 accepts the offer of conversion services, the interface 330 can be configured to receive, from the users 306, 308, and 310, the details of the OTS software licenses to be converted. To achieve this, the conversion module 320 can be configured to include the necessary logic, commands, instructions, and protocols to generate and provide the interface 330, such as command line or graphical user interfaces (GUIs), to receive the request for the conversion services.

The conversion module 320 can be configured to provide the interface 330 to the users 306, 308, and 310 via the network 312 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol. Likewise, the conversion module 320 can be configured to allow software programs executing on the computing systems of the users 306, 308, and 310 to provide the request. The conversion module 320 can be configured to include an application programming interface (API) to provide the interface 330 that allows software programs of the users 306, 308, and 310 to call the conversion module 320 and provide the request.

In embodiments, the request provided by the users 306, 308, and 310 can identify the OTS software license held by the users 306, 308, and 310 by providing details such as software program name, identification of the associated ISV, number of OTS software licenses held, and terms of the OTS software license (if necessary). Once received, the conversion module 320 can be configured to search the set 324 of ISV records 326 to identify the appropriate rules to convert the terms of the OTS software license, held by the users 306, 308, and 310, to a new cloud software license. Once identified, the conversion module 320 can be configured to convert the requested OTS software license to the new cloud software license. To achieve this, the conversion module 320 can be configured to include the necessary logic, commands, instructions, and protocols to search the set 324 of ISV records 326, to retrieve the appropriate rules, and to convert the terms of the OTS software license according to the retrieved rules.

For example, the user 310 can request to convert the OTS software license 318 for the OTS software program 316. The user 310 can provide, to the BYOL service 302, the details of the OTS software license such as the OTS software program 316 name (e.g. "web server version 1"), identification of the associated ISV 304 (e.g. "XYZ software company"), number of OTS software licenses 318 held (e.g. "5"), and terms of the OTS software license 318 (e.g. # of users: 5, # of instances: 3, duration: 1 year, technical support: limited 90 days). The BYOL service 302 can retrieve the appropriate ISV record 326 (e.g. record 400) from the repository 328 and can identify the rules for conversion. The BYOL service 302 can then convert the terms of the OTS software license 318 to terms for the cloud 314. For example, based on the rules in the example record 400, each new cloud software license can include the terms—# of concurrent users: 5, # of virtual machines: 3, duration in the cloud: 1 year, technical support: none.

In embodiments, once converted, the BYOL service 302 can be configured to notify the appropriate users 306, 308, and 310 and the appropriate ISVs 304 of the terms of the new cloud software license converted for use in the clouds 314. The conversion module 320 can be configured to notify the appropriate users 306, 308, and 310 and appropriate ISVs 304 utilizing the interface 330 and 322, respectively. Likewise, the BYOL service 302 can be configured to store the new cloud license and the converted terms in a record 332 associated with the appropriate users 306, 308, and 310 and the appropriate ISVs 304. The conversion module 320 can be configured to maintain the record 332 in the repository 328.

In embodiments, the BYOL service 302 can be configured to offer additional license terms to the users 306, 308, and 310 during conversion of the OTS software licenses on behalf of the ISVs 304. The additional license terms can be any type of terms that were not contemplated by the OTS software license but relevant to the use of the software in the clouds 314. For example, the additional license terms can be an expansion of the use of the OTS software programs (e.g. additional concurrent users, additional virtual machines, additional number of cloud deployments beyond the new cloud software license terms), an expansion of the technical support offer by the new cloud license (e.g. technical support for the cloud deployment), expansion of the duration, and the like.

In embodiments, the BYOL service 302 can be configured to receive, from the ISVs 304, the additional license terms that can expand or modify the new cloud software license. Additionally, the BYOL service 302 can be configured to receive, from the ISVs, a charge associated with the additional license terms. In particular, the conversion module 320 can be configured to receive the additional license terms in the interface 322.

In embodiments, once the additional license terms are received, the BYOL service 302 can be configured to store the additional license terms in a set 334 of ISV additional license terms (ALT) records 336. In particular, the conversion module 320 can be configured to store the additional license terms for each ISV 304 in a ALT record 336 associated with an identification of the ISV 304 (e.g. name). The conversion module 320 can maintain the set 334 of ALT records 336 in a repository 328.

Figure 4B:
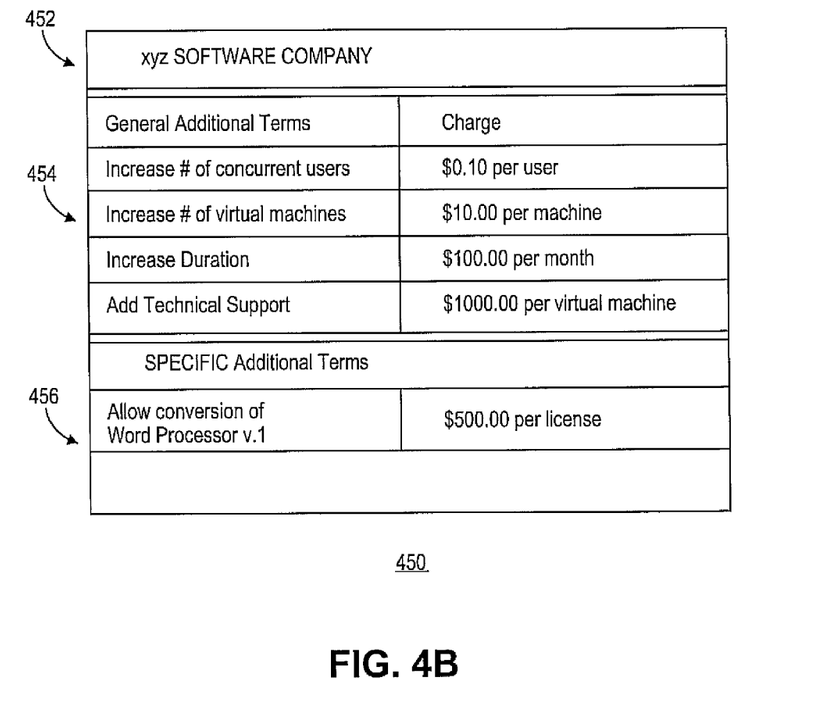
FIG. 4B illustrates an exemplary record for storing additional license terms associated with the software license conversion, according to various embodiments.

FIG. 4B illustrates an exemplary ALT record 450 for a particular ISV 304 "XYS Software Company", according to various embodiments. As illustrated, the record 450 can include an entry 452 that identifies the particular ISV 304 associated with the record 450. The record 450 also include an entry 454 that defines the additional license terms for purchase and the cost of the additional license terms. The entry 454 can include a table that maps the additional license terms to the cost associated with the additional license terms. As illustrated, the general rules, provided by the ISV 304, can alter the terms of the new cloud software license, for example, by adding technical support provided in the cloud. The record 450 can also include an entry 456 that define the additional terms for purchase for specific OTS software programs. As illustrated, for example, the ISV 304 can provide an option that allows conversion of OTS software licenses for the specific software program "Word Processor version 1". While FIG. 4B illustrates several additional license terms, one skilled in the art will realize that FIG. 4B is one example. The ISVs 304 can provide any additional terms that modify the new cloud software license for a certain cost.

In embodiments, once an OTS software license is converted as described above, the BYOL service 302 can be configured to offer the additional license terms to the users 306, 308, and 310 requesting conversion. In particular, the conversion module 320 can be configured to search the set 334 of ALT records 336 to identify the additional license terms and charge associated with the appropriate ISV 304. To achieve this, the conversion module 320 can be configured to include the necessary logic, commands, instructions, and protocols to search the set 334 of ALT records 336, and to retrieve the additional license terms. Once identified, the conversion module 320 can be configured provide the additional license terms and associated charge to the users 306, 308, and 310 via the interface 330. Likewise, the conversion module 320 can be configured to receive the users 306, 308, and 310 acceptance of any additional terms via the interface 330.

In embodiments, if any of the user 306, 308, and 310 accepts the additional license terms, the BYOL service 302 can be configured to notify the appropriate ISV 304 of the acceptance of the additional license terms. In particular, the conversion module 320 can be configured to notify the appropriate ISV 304 via the interface 322. Likewise, the BYOL service 302 can be configured to negotiate payment of the charge for the additional license terms with the users 306, 308, and 310 and forward the payment to the appropriate ISV 304. In particular, the conversion module 320 can be configured to negotiate payment of the charge for the additional license terms with the users 306, 308, and 310 via the interface 330 utilizing any type of known electronic payment procedure and forward the payment to the appropriate ISV 304 utilizing the known electronic payment procedures. If payments is accepted, the conversion module 304 can be configured to modify the new cloud software license according to the purchased additional license terms.

In embodiments, the BYOL service 302 can be configured to establish a communication channel between the users 306, 308, and 310 and the appropriate ISV 304 in the event the user 306, 308, and 310 and ISV 304 desire to negotiate the additional license terms and/or payment of the charge.

Figure 5:
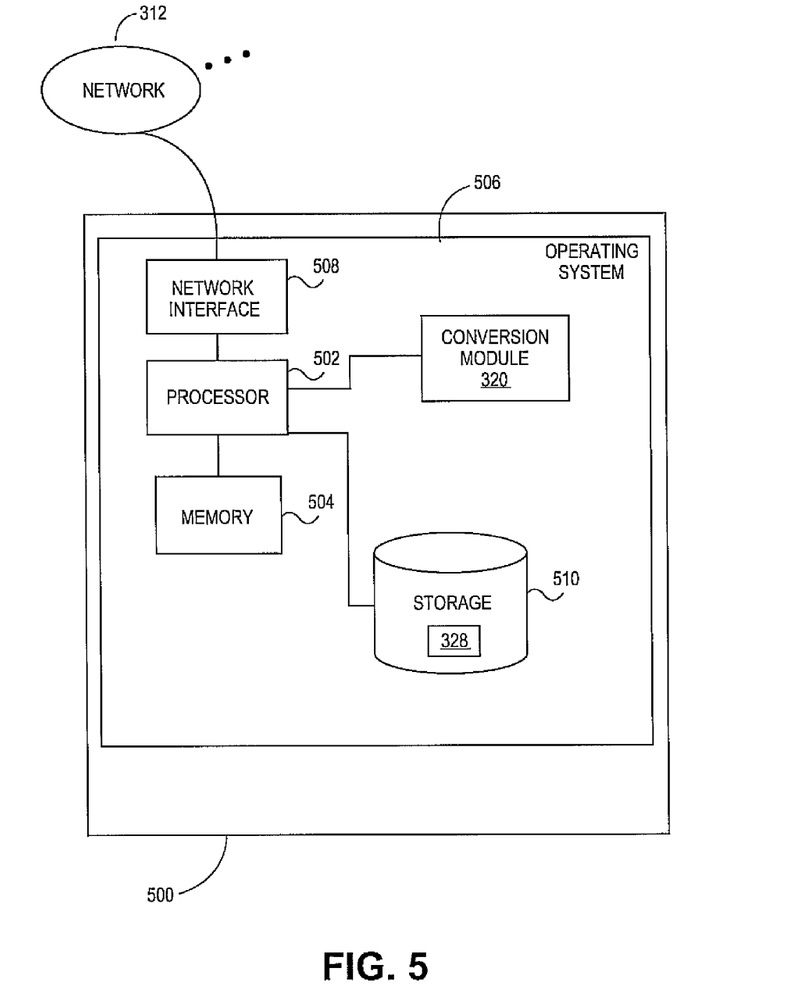
FIG. 5 illustrates an exemplary hardware configuration for a computing system supporting the service, according to various embodiments.

FIG. 5 illustrates an exemplary diagram of hardware and other resources that can be incorporated in a computing system 500 supporting the BYOL service 302, which can implement the conversion module 320, and configured to communicate with the one or more networks 312, according to embodiments. In embodiments as shown, the computing system 500 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other open-source or proprietary operating system or platform. Processor 502 also communicates with one or more computer readable storage media or devices 510, such as hard drives, optical storage, and the like, which can store the repository 330. Processor 502 further communicates with network interface 508, such as an Ethernet or wireless data connection, which in turn communicates with one or more networks 312, such as the Internet or other public or private networks.

Processor 502 also communicates with the conversion module 320 to execute control logic and allow for software license conversion processes as described above and below. Other configurations of the computing system 500, associated network connections, and other hardware and software resources are possible.

While FIG. 5 illustrates the computing system 500 as a standalone system including a combination of hardware and software, the computing system 500 can include multiple systems operating in cooperation. The conversion module 320 can be implemented as a software application or program capable of being executed by the computing system 500, as illustrated, or other conventional computer platforms. Likewise, the conversion module 320 can also be implemented as a software module or program module capable of being incorporated in other software applications and programs. In either case, the conversion module 320 can be implemented in any type of conventional proprietary or open-source computer language. When implemented as a software application or program code, the conversion module can be stored in a computer readable storage medium or device, such as storage 510 accessible by the computing system 500. Likewise, during execution, a copy of the conversion module 320 can be stored in the memory 504.

Figure 6:
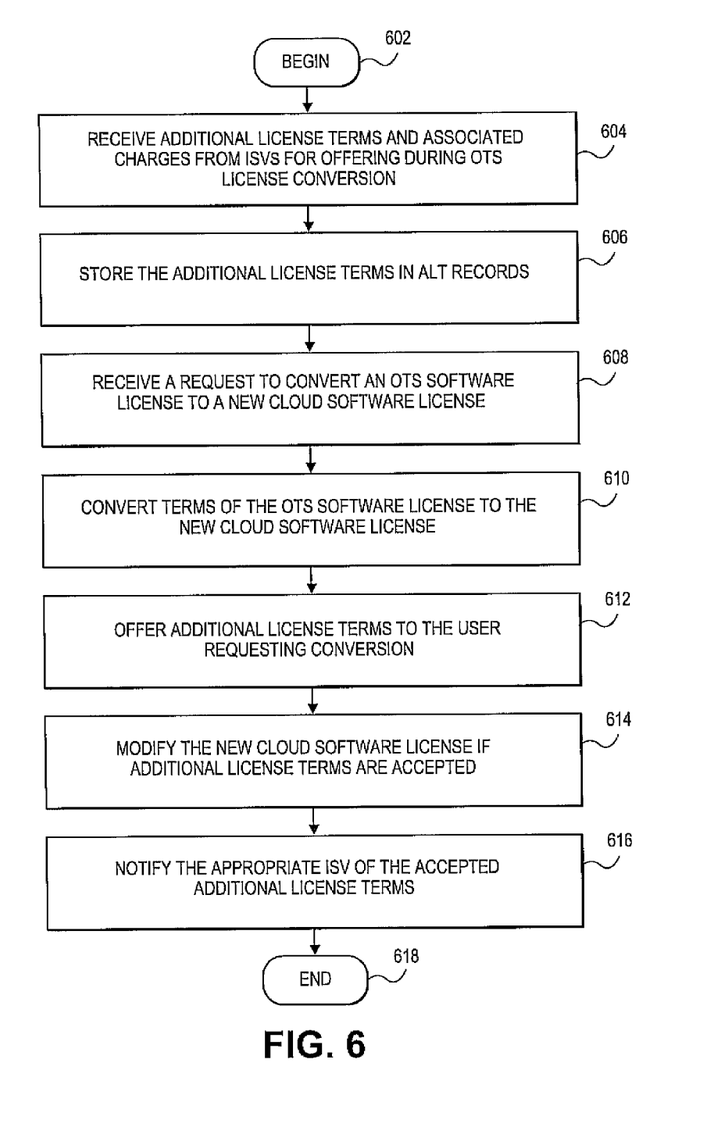
FIG. 6 illustrates a flowchart of an exemplary process for converting software licenses, according to various embodiments.

FIG. 6 illustrates a flow diagram of an exemplary process for providing a software license conversion service. In 602, processing can begin. In 604, the BYOL service 302 can receive additional license terms and associated charges from the ISVs 304 for offer during OTS license conversion. For example, the additional license terms can be an expansion of the use of the OTS software programs (e.g. additional concurrent users, additional virtual machines, additional number of cloud deployments beyond the new cloud software license terms), an expansion of the technical support offer by the new cloud license (e.g. technical support for the cloud deployment), expansion of the duration, and the like.

In 606, the BYOL service 302 can store the rules in ALT records. For example, the BYOL service 302 can store the additional license terms in a set 334 of ISV additional license terms (ALT) records 336. In 608, the BYOL service 302 can receive a request to convert an OTS software license to a new cloud software license. For example, the request provided by the users 306, 308, and 310 can identify the OTS software license held by the users 306, 308, and 310 by providing details such as software program name, identification of the associated ISV, number of OTS software licenses held, and terms of the OTS software license (if necessary).

In 610, the BYOL service 302 can convert the terms of the OTS software license to the new cloud software license. For example, the BYOL service 302 can search the set 324 of ISV records 326 to identify the appropriate rules to convert the terms of the OTS software license, held by the users 306, 308, and 310, to a new cloud software license. Once identified, the BYOL service 302 can convert the requested OTS software license to the new cloud software license.

In 612, the BYOL service 302 can offer the additional license terms to the user requesting conversion. In 614, the BYOL service 302 can modify the new cloud software license if the additional license terms are accepted. For example, the BYOL service 302 can modify the terms of the new cloud software license by the additional license terms that are accepted and purchased.

In 616, the BYOL service 302 can notify the appropriate ISV 304 of the accepted additional license terms. In 618, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving, by a processor from a software vendor system, a rule for converting a software license associated with a software program to a cloud software license associated with using the software program in a cloud computing environment;
   receiving, by the processor from an owner computer of the software license, a request to convert the software license to the cloud software license, the request comprising an identifier of the software vendor system and a license identifier, wherein the license identifier corresponds to the software license;
   identifying, by the processor based on the received identifier of the software vendor system and the license identifier, the rule for converting the software license to the cloud software license;
   converting, by the processor, the software license to the cloud software license, in response to the request by changing one or more terms of the software license, based on the rule, wherein the cloud software license controls the software program usage in the cloud computing environment; and
   transmitting, by the processor, the cloud software license to the owner computer.

2. The method of claim 1, further comprising:
   offering, to the owner computer of the software license, additional license terms for purchase;
   modifying the cloud software license in response to the owner computer purchasing at least one of the additional license terms; and
   notifying the software vendor system of the purchase of the at least one of the additional license terms.

3. The method of claim 2, further comprising:
   storing a record of the additional license terms, wherein the record comprises an identification of the software vendor system, the additional license terms, and a charge to purchase the additional license terms.

4. The method of claim 2, the method further comprising:
   negotiating payment of a charge to purchase at least one of the additional license terms.

5. The method of claim 2, further comprising:
   providing an interface to offer the additional license terms.

6. The method of claim 2, wherein the additional license terms comprise at least one of an increased usage of the software program, an increased duration of use of the software program, and technical support for the software program.

7. The method of claim 2, further comprising:
   receiving a fee from the software vendor system for offering the additional license terms.

8. A non-transitory computer readable storage medium storing instructions which, when executed, cause a processor to perform operations comprising:
   receiving, by the processor from a software vendor system, a rule for converting a software license associated with a software program to a cloud software license associated with using the software program in a cloud computing environment;
   receiving, by the processor from an owner computer of the software license, a request to convert the software license to the cloud software license, the request comprising an identifier of the software vendor system and a license identifier, wherein the license identifier corresponds to the software license;
   identifying, by the processor based on the received identifier of the software vendor system and the license identifier, the rule for converting the software license to the cloud software license;
   converting, by the processor, the software license to the cloud software license, in response to the request by changing one or more terms of the software license, based on the rule, wherein the cloud software license controls the software program usage in the cloud computing environment; and
   transmitting, by the processor, the cloud software license to the owner computer.

9. The non-transitory computer readable storage medium of claim 8, the operations further comprising:
   offering, to the owner computer of the software license, additional license terms for purchase;
   modifying the cloud software license in response to the owner computer purchasing at least one of the additional license terms; and
   notifying the software vendor system of the purchase of the at least one of the additional license terms.

10. The non-transitory computer readable storage medium of claim 9, the operations further comprising:
    storing a record of the additional license terms, wherein the record comprises an identification of the software vendor system, the additional license terms, and a charge to purchase the additional license terms.

11. The non-transitory computer readable storage medium of claim 9, the operations further comprising:
    negotiating payment of a charge to purchase at least one of the additional license terms.

12. The non-transitory computer readable storage medium of claim 9, the operations further comprising:
    providing an interface to offer the additional license terms.

13. The non-transitory computer readable storage medium of claim 9, wherein the additional license terms comprise at least one of an increased usage of the software program, an increased duration of use of the software program, and technical support for the software program.

14. The non-transitory computer readable storage medium of claim 9, the operations further comprising:
    receiving a fee from the software vendor system for offering the additional license terms.

15. A system comprising:
    a processor; and a storage device coupled to the processor, the storage device storing instructions that, when executed by the processor, cause the processor to:

receive, from a software vendor system, a rule for converting a software license associated with a software program to a cloud software license associated with using the software program in a cloud computing environment;

receive, from an owner computer of the software license, a request to convert the software license to the cloud software license, the request comprising an identifier of the software vendor system and a license identifier, wherein the license identifier corresponds to the software license;

identify, based on the received identifier of the software vendor system and the license identifier, the rule for converting the software license to the cloud software license;

convert the software license to the cloud software license, in response to the request by changing one or more terms of the software license, based on the rule, wherein the cloud software license controls the software program usage in the cloud computing environment; and transmit the cloud software license to the owner computer.

16. The system of claim 15, wherein the instructions further cause the processor to:

offer, to the owner computer, additional license terms for purchase;

modify the cloud software license in response to the owner computer purchasing at least one of the additional license terms; and notify the software vendor system of the purchase of the at least one of the additional license terms.

17. The system of claim 16, wherein the instructions further cause the processor to:

store a record of the additional license terms in the storage device, wherein the record comprises an identification of the software vendor system, the additional license terms, and a charge to purchase the additional license terms.

18. The system of claim 16, wherein the instructions further cause the processor to:

negotiate payment of a charge to purchase at least one of the additional license terms.

19. The system of claim 16, wherein the additional license terms comprise at least one of an increased usage of the software program, an increased duration of use of the software program, and technical support for the software program.

20. The system of claim 16, wherein the instructions further cause the processor to:

receive a fee from the software vendor system for offering the additional license terms.

* * * * *